(12) United States Patent
Collinson et al.

(10) Patent No.: US 9,357,752 B2
(45) Date of Patent: Jun. 7, 2016

(54) APPARATUS FOR TREATMENT OF PLANTS (75) Inventors: Michael Howard D. Hearn Collinson, Caledon (CA); Todd Gordon Mason, Oakville (CA); John Clifford Sutton, Ariss (CA); Peter G. Kevan, Cambridge (CA)

(73) Assignee: Bee Vectoring Technology Inc., Mississauga, ON (CA)

( * ) Notice: Subject to any disclaimer, the term of this patent is extended or adjusted under 35 U.S.C. 154(b) by 280 days.

(21) Appl. No.: 14/110,323

(22) PCT Filed: Apr. 3, 2012

(86) PCT No.: PCT/CA2012/000288
§ 371 (c)(1),
(2), (4) Date: Mar. 11, 2014

(87) PCT Pub. No.: WO2012/135940
PCT Pub. Date: Oct. 11, 2012

(65) Prior Publication Data
US 2014/0199914 A1 Jul. 17, 2014

Related U.S. Application Data

(60) Provisional application No. 61/472,872, filed on Apr. 7, 2011, provisional application No. 61/609,549, filed on Mar. 12, 2012.

(51) Int. Cl.
*A01K 47/06* (2006.01)
*A01K 51/00* (2006.01)

(52) U.S. Cl.
CPC .................. *A01K 47/06* (2013.01); *A01K 51/00* (2013.01)

(58) Field of Classification Search
CPC ....... A01K 47/00; A01K 47/04; A01K 47/06; A01K 51/00
See application file for complete search history.

(56) References Cited

U.S. PATENT DOCUMENTS 2,232,343 A 2/1941 Sauter
(Continued)

FOREIGN PATENT DOCUMENTS

DE 10054048 A1 5/2002
GB 1470385 A 4/1977
(Continued)

OTHER PUBLICATIONS

Alon Bilu, et al. "Honey Bee Dispersal of Biocontrol Agents: an Evaluation of Dispensing Devices", Biocontrol Science and Technology, Sep. 2004, vol. 14, No. 6, pp. 607-617.
Bettina MacCagnani, et al., "Investigation of hive-mounted devices for the dissemination of microbiological preparations by Bombus terrestris" Bulletin of Insectology, 2005, pp. 3-8.
Dave Harrison, "Latest Buzz from Harrow", Greenhouse Canada, May 13, 2011.
(Continued)

*Primary Examiner* — Kathleen Alker
(74) *Attorney, Agent, or Firm* — Bereskin & Parr/S.E.N.C.R.L., s.r.l.

(57) ABSTRACT

A tray for positioning in an exit path of a bee hive comprises a base, a bee entrance end, and a bee exit end. Spaced apart side walls extend upwardly from the base. The sidewalls extend generally lengthwise between the bee entrance end and bee exit end. A plurality of posts extend upwardly from the base and are positioned between the bee entrance end and the bee exit end. The posts are generally circular in cross-section. The posts act as obstacles around which the bees must walk to reach the bee exit end from the bee entrance end.

7 Claims, 10 Drawing Sheets

(56) References Cited

U.S. PATENT DOCUMENTS

| | | | |
|---|---|---|---|
| 2,485,879 A | 10/1949 | Harwood | |
| 3,034,949 A | 5/1962 | Ryker | |
| 3,069,702 A | 12/1962 | Reed | |
| 4,594,744 A | 6/1986 | Ferrari | |
| 5,211,597 A * | 5/1993 | Scott | A01K 47/00 449/27 |
| 5,348,511 A | 9/1994 | Gross et al. | |
| 5,989,100 A | 11/1999 | Kovach | |
| 6,306,386 B1 | 10/2001 | Cole et al. | |
| 2004/0077291 A1* | 4/2004 | Arthur | A01K 51/00 449/20 |
| 2004/0219863 A1* | 11/2004 | Willacy | A01G 7/00 449/2 |
| 2007/0218804 A1* | 9/2007 | Allan | A01K 47/00 449/4 |
| 2007/0224913 A1* | 9/2007 | Brisson | A01K 51/00 449/3 |
| 2011/0280839 A1 | 11/2011 | Ford | |

FOREIGN PATENT DOCUMENTS

| | | |
|---|---|---|
| RU | 2024223 C1 | 12/1994 |
| RU | 2156570 C1 | 9/2009 |
| WO | 02/094014 A1 | 11/2002 |
| WO | 2010/136599 A2 | 12/2010 |
| WO | 2011/026983 A1 | 3/2011 |
| WO | 2011/097749 A1 | 8/2011 |

OTHER PUBLICATIONS

H. Yu, et al. "Effectiveness of Bumblebees and Honeybees for Delivering Inoculum of Gliocladium Roseum to Raspberry Flowers to Control Botrytis Cinerea" Biological Control, vol. 10, Jul. 7, 1997, pp. 113-122.

Jawahar L. Jyoti, et al. "Honey Bees (*Hymenoptera*: Apidae) as Vectors of Bacillus thuringiensis for Control of Banded Sunflower Moth (*Lepidoptera tortricidae*)" Biological Control, vol. 28, No. 6, 1999, pp. 1173-1176.

Lawrence E. Datnoff, et al. "The Use of Silicon for Integrated Disease Management: Reducing Fungicide Applications and Enchancing Host Plant Resistance" Elsevier Science B.V., 2001, pp. 171-184.

Les Shipp, "BPI10-010 Design of a Comerical Dispenser for Delivery of Biocontrol Agents in Greenhouse by Bee Pollinators", Agriculture and Agri-Food Canada, May 18, 2011, pp. 1-2.

Peter G. Kevan, et al. "Honey Bees, Bumble Bees, and Biocontrol" Bee Pollination in Agricultural Ecosystems, Oxford University Press, 2008, pp. 65-79.

Peter Kevan, "Pollinating Bees Can Now Suppress Crop Pests: Vector Biocontrol Costs the Same as Conventional Fungicides" The Grower, vol. 62, No. 01, Jan. 2012, p. 14.

Selim Dedej, et al. "Effectiveness of Honey Bees in Delivering the Biocontrol Agent Bacillus Subtilisto Blueberry Flowers to Suppress Mummy Berry Disease" Biological Control, vol. 31, 2004, pp. 422-427.

Veerle Mommaerts, et al. "Entomovectoring in Plant Protection", Anthropod-Plant Interactions, Jan. 26, 2011, pp. 81-95.

* cited by examiner

APPARATUS FOR TREATMENT OF PLANTS

CROSS-REFERENCES TO RELATED APPLICATIONS

This application claims priority from U.S. Provisional Patent Application Nos. 61/472,872 (filed on Apr. 7, 2011), and 61/609,549 (filed on Mar. 12, 2011), both of which are incorporated herein by reference in their entirety.

FIELD

The disclosure relates to insect vectoring, such as bee vectoring. Specifically, the disclosure relates to apparatuses for dissemination of plant treatment agents by insects.

BACKGROUND

U.S. Pat. No. 5,348,511 (Gross et al.) purports to disclose biocontrol agents that are disseminated for the control of pests by *Apis mellifera* L. using a device inserted into a modified down-sized super which is integrated as a substructure of a conventional, commercial beehive. The device provides separate entry and departure pathways which allows exiting bees to be surface-contaminated with the biocontrol agent as they exit the hive.

U.S. Pat. No. 5,189,100 (Kovach) purports to disclose a bee dissemination device or dispenser that is non destructive to the hive, is easy to insert, refill, and remove, and includes a cartridge insertable in a housing. The device is designed to be used by a non professional bee keeper, such as a grower. It is inserted into the entrance of a standard bee hive with minimal disruption to the hive or colony. When the bees exit the hive, they walk up a ramp through a dry biological control suspension and leave the hive, carrying and depositing the biological control agent onto the flowers as they pollinate the crop. When the biological control agent runs low, additional material is added easily by lifting a hinged lid or replacing the old cartridge with a filled one. The lid also provides some moisture protection to keep the biological agent dry, thereby facilitating bee inoculation. The dispenser is removed by simply pulling it from the hive entrance when pollination activities are completed. The removal is non disruptive and does not destroy the integrity of the hive. When the device is inserted, refilled, or removed at night, minimal protective clothing is required by the user.

PCT patent application publication no. WO 2010/136599 (Put et al.) purports to disclose the dissemination of biological control agents or other substances through the use of bees, in particular bumblebees. A disseminator device is installable in or in connection to the hive, and contains biological control agents or other substances which are picked up, carried and disseminated by the bees when leaving the hive.

SUMMARY

The following summary is intended to introduce the reader to various aspects of the applicant's teaching, but not to define any invention.

According to one aspect, a tray for positioning in an exit path of a bee hive comprises a base, a bee entrance end, and a bee exit end. Spaced apart side walls extend upwardly from the base. The sidewalls extend generally lengthwise between the bee entrance end and bee exit end. A plurality of posts extend upwardly from the base and are positioned between the bee entrance end and the bee exit end. The posts are generally circular in cross-section. The posts act as obstacles around which the bees must walk to reach the bee exit end from the bee entrance end.

In some examples, the posts may be staggered such that the bees may not walk in a straight line from the bee entrance end to the bee exit end.

In some examples, the tray may comprise a removable top sealed to the side walls. The top may be light impermeable and water impermeable.

In some examples, the tray may comprise a powdered plant treatment formulation housed in the tray. The plant treatment formulation may have a depth of between about 2 mm and about 4 mm.

In some examples, the tray may further comprise a first set of steps leading downwardly to the base at the bee entrance end, and a second set of steps leading upwardly from the base at the bee exit end.

In some examples, each post may have a top end and an opposed bottom end at base, and each post may be radiused at the bottom end.

In some examples, the tray may further comprise at least one obstruction extending inwardly from each of the sidewalls and upwardly from the base.

In some examples, the tray may be plastic and may be moisture impermeable.

According to another aspect, a replaceable tray for inserting into an exit path of a bee hive comprises a base, and at least one sidewall extending upwardly from the base and surrounding a periphery of the base. The at least one sidewall defines an upper rim. A powdered plant treatment agent is on the base. A removable top is sealed to the upper rim. The removable top is moisture impermeable and light impermeable.

In some examples, the top may be heat-sealed to the sidewalls. The top may be a metal foil. The top may carry a net positive electrostatic charge.

According to another aspect, a replaceable tray for inserting into an exit path of a bee hive comprises a base, and at least one sidewall extending upwardly from the base and surrounding a periphery of the base. A powdered plant treatment agent is on the base. The powdered plant treatment agent has a depth of between 2 mm and 4 mm.

According to another aspect, an insect vectoring apparatus comprises a tray for positioning in an exit path of a beehive. The tray comprises a bottom, and at least one side wall extending upwardly from the bottom. The tray further comprises a bee entrance end and a bee exit end, and a longitudinal axis extending therebetween. An openable tray lid is positioned above the sidewalls. The lid comprises at least one downwardly extending barrier wall extending thereacross in a direction transverse to the longitudinal axis.

In some examples, the at least one barrier wall may comprise a plurality of barrier walls.

In some examples, the lid may comprise at least one vent.

According to another aspect, a honey bee domicile comprises at least one super, and a bottom board. The bottom board has a bottom board opening. An entrance board is receivable in the bottom board. The entrance board defines an entrance pathway for honey bees to reach the at least one super from the opening. An exit board is receivable in the bottom board, and is vertically spaced from the entrance board. The exit board defines an exit pathway for the honey bees to reach the opening from the at least one super. A removable tray is positionable in the exit pathway. The bees walk through the removable tray to reach the opening from the at least one super. The tray is configured to receive a powdered plant treatment agent.

In some examples, the entrance board may be slidably receivable in the bottom board through the opening. In some examples, the exit board may be slidably receivable in the bottom board through the opening.

In some examples, the entrance pathway may include a light blocking feature.

In some examples, the honey bee domicile may include a lid mountable above tray. The lid may include at least one entrance port forming an entrance to the tray, and at least one exit port forming an exit to the tray.

In some examples, the entrance board may include a recess, and the tray may be receivable in the recess.

According to another aspect, a method for dusting bees with a plant treatment formulation comprises: providing a tray in an exit path of a bee hive, the tray having a base; providing a layer of the plant treatment formulation on the base, the layer having an initial depth, the exit path having a vertical clearance above the layer; selecting the initial depth such that the initial depth is less than a spiracle height of the bees, and a depletion time of the layer corresponds to a shelf life of the plant treatment formulation; and selecting the vertical clearance such that for the duration of the depletion time, bee flight within the exit path is discouraged.

In some examples, the initial depth may be between about 2 mm and about 4 mm.

In some examples, the depletion time and shelf life may be less than 10 days, more specifically between 4 days and 5 days.

In some examples, the vertical clearance may be less than 1 inch. In some examples wherein the bees are bumble bees, the vertical clearance may be less than 0.875 inches. In other examples, wherein the bees are honey bees, the vertical clearance may be less than 0.75 inches.

According to another aspect, a method for bee vectoring using bees and a treatment powder comprises: placing a layer of the treatment powder on a floor of an exit path from which the bees exit a domicile, the exit path generally having a path length extending parallel to the direction of bee travel from a path inlet to a path outlet when exiting the domicile, and a path width generally perpendicular to the path length, and a path clearance height extending from an upper surface of the layer to a lowermost surface of a path ceiling spaced above the floor, the path ceiling height large enough to accommodate passage of bees when walking on the floor and small enough to inhibit bee flight above the floor; the layer having a layer width generally equal to the path width, a layer length extending along at least a portion of the path length, and an initial layer depth extending from the floor to the upper surface of the layer of treatment powder.

The layer length and the initial layer depth may be sized such that the initial layer height is less than a spiracle height of the bees, and the layer length at the initial layer height provides a sufficient amount of powder to have a depletion time that corresponds to a shelf life of the plant treatment formulation. The layer length may also be long enough to transfer to a bee walking from the path inlet to the path outlet an amount of treatment powder sufficient to load each bee to, or near to, its carrying capacity.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a perspective illustration of an exemplary bee domicile;

FIG. 2 is an exploded perspective illustration of the bee domicile of FIG. 1;

FIG. 3 is a perspective illustration of the bee domicile of FIG. 1, showing a receptacle lid in an open position and a tray removed from a receptacle;

FIG. 4 is a perspective illustration of the bee domicile of FIG. 1, showing a receptacle lid in an open position, and a tray received in a receptacle;

FIG. 5 is a perspective illustration of the tray of FIGS. 3 and 4;

FIG. 6 is an exploded perspective illustration of another exemplary bee domicile;

FIG. 7 is a cross-sectional illustration of a portion of the bee domicile of FIG. 6, showing an entrance board, an exit board, a tray, and an openable lid received in the bee domicile;

FIG. 8 is an exploded perspective illustration of the entrance board, exit board, tray, and lid of FIG. 8;

FIG. 9 is an exploded perspective illustration of another exemplary bee domicile; and FIG. 10 is a perspective illustration of the receptacle of the bee domicile of FIG. 9.

DETAILED DESCRIPTION

Various apparatuses, processes, and/or formulations will be described below to provide an example of an embodiment of each claimed invention. No embodiment described below limits any claimed invention and any claimed invention may cover apparatuses, processes, and/or formulations that differ from those described below. The claimed inventions are not limited to apparatuses, processes, and/or formulations having all of the features of any one apparatus, process, and/or formulation described below, or to features common to multiple or all of the apparatuses, processes, and/or formulations described below. It is possible that an apparatus, process, and/or formulation described below is not an embodiment of any exclusive right granted by issuance of this patent application. Any invention disclosed in an apparatus, process, and/or formulation described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Referring to FIG. 1, an exemplary bee domicile 100 (also referred to as a bee hive) is shown. The bee domicile 100 includes a domicile body 102, the interior of which may be colonized by a bumble bee colony, or a colony of another type of bee. A domicile lid 104 is removably receivable on the domicile body 102.

Referring to FIG. 2, in the example shown, the domicile body 102 includes an entrance port 106 and an exit port 108, through which bees enter and exit the domicile 100, respectively. An entrance/exit assembly 110 is mountable to the entrance port 106 and the exit port 108. The entrance/exit assembly includes an entrance conduit 112, which is mountable to the entrance port 106 and extends inwardly into the body 102. The entrance/exit assembly 110 further includes an exit conduit 114, which is mountable to the exit port 108 and extends outwardly from the body 102. Both the entrance conduit 112 and the exit conduit 114 are generally frustoconcial. The entrance conduit 112 tapers in cross sectional area going in a direction away from the entrance port 106 and into the domicile body 102, and the exit conduit 114 tapers in cross sectional area going in a direction away from the exit port 108 and away from the domicile body 102. This tapering may encourage bees to enter the bee domicile 100 through the entrance port 106 rather than through the exit port 108, and to exit the bee domicile 100 through the exit port 108 rather than through the entrance port 106. Particularly, when approaching the domicile 100 from the exterior, the bee is more likely to enter the entrance conduit 112, as the opening to the entrance conduit 112 is larger than the opening to the exit conduit 114.

Figure 1:
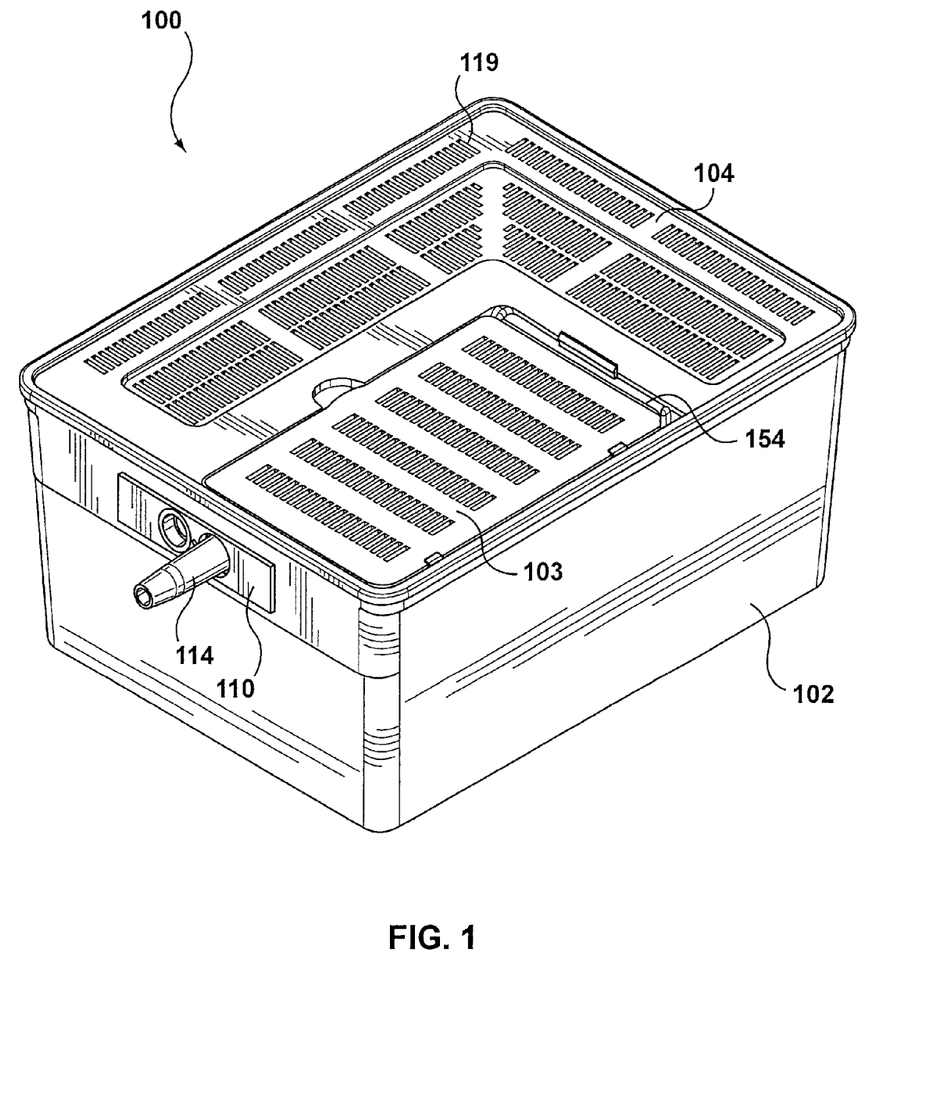
Figure 2:
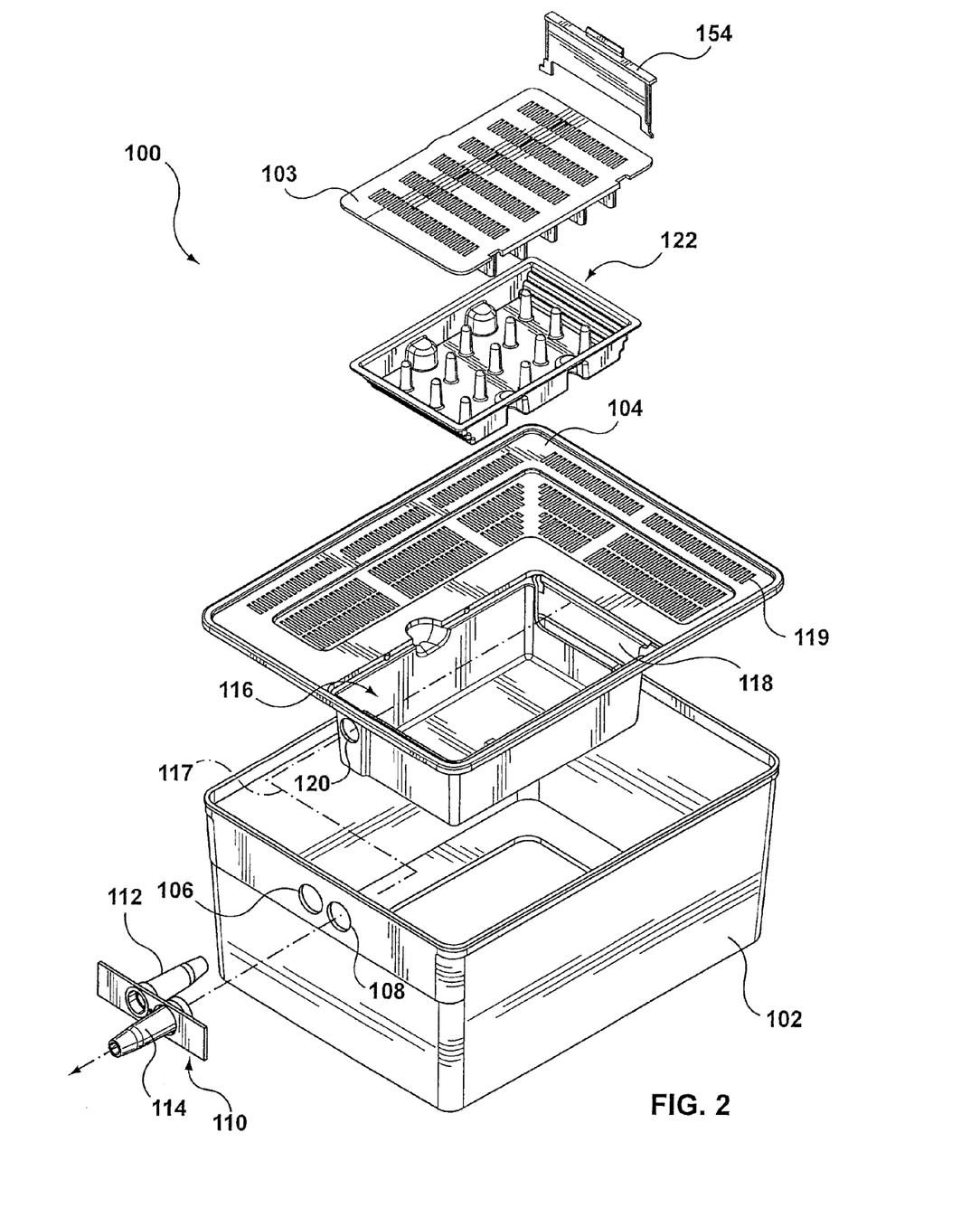
Figure 3:
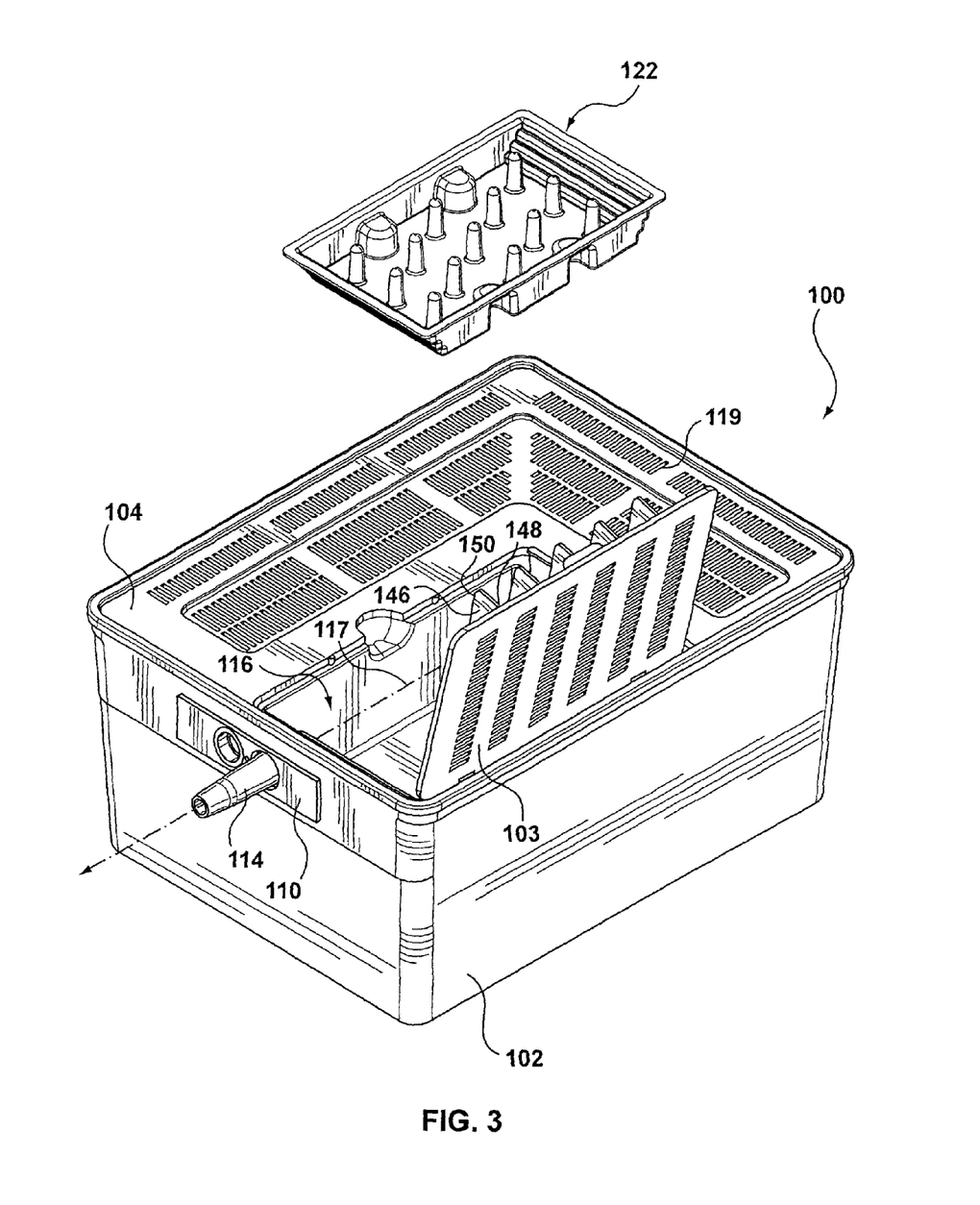

Referring to FIGS. 2 and 3, in the example shown, the domicile lid 104 includes a downwardly extending receptacle 116, which is integrally formed with the domicile lid 104. An openable receptacle lid 103 (also referred to as an openable lid 103) is pivotably mounted to the domicile lid 104, and is pivotable between an open position, shown in FIG. 3, and a closed position, shown in FIG. 1.

Referring still to FIGS. 2 and 3, in the example shown, both the domicile lid 104 and the receptacle lid 103 include at least one vent 119, so that the domicile body 102 and the receptacle 116 are vented to the outside environment.

Referring still to FIGS. 2 and 3, in the example shown, the receptacle 116 includes a receptacle entrance port 118, which opens into the domicile body 102, and through which bees may enter the receptacle 116 from the domicile body 102. The receptacle 116 further includes a receptacle exit port 120, through which bees may exit the receptacle 116. The receptacle exit port 120 is aligned with the exit port 108 of the body 102. In order to exit the domicile 100, bees travel along exit path 117, which passes from the domicile body 102 and into the receptacle 116 via the receptacle entrance port 118, through the receptacle 116, out of the receptacle 116 through the receptacle exit port 120, into the exit conduit 114 via the exit port 108, and out of the exit conduit 114.

Figure 4:
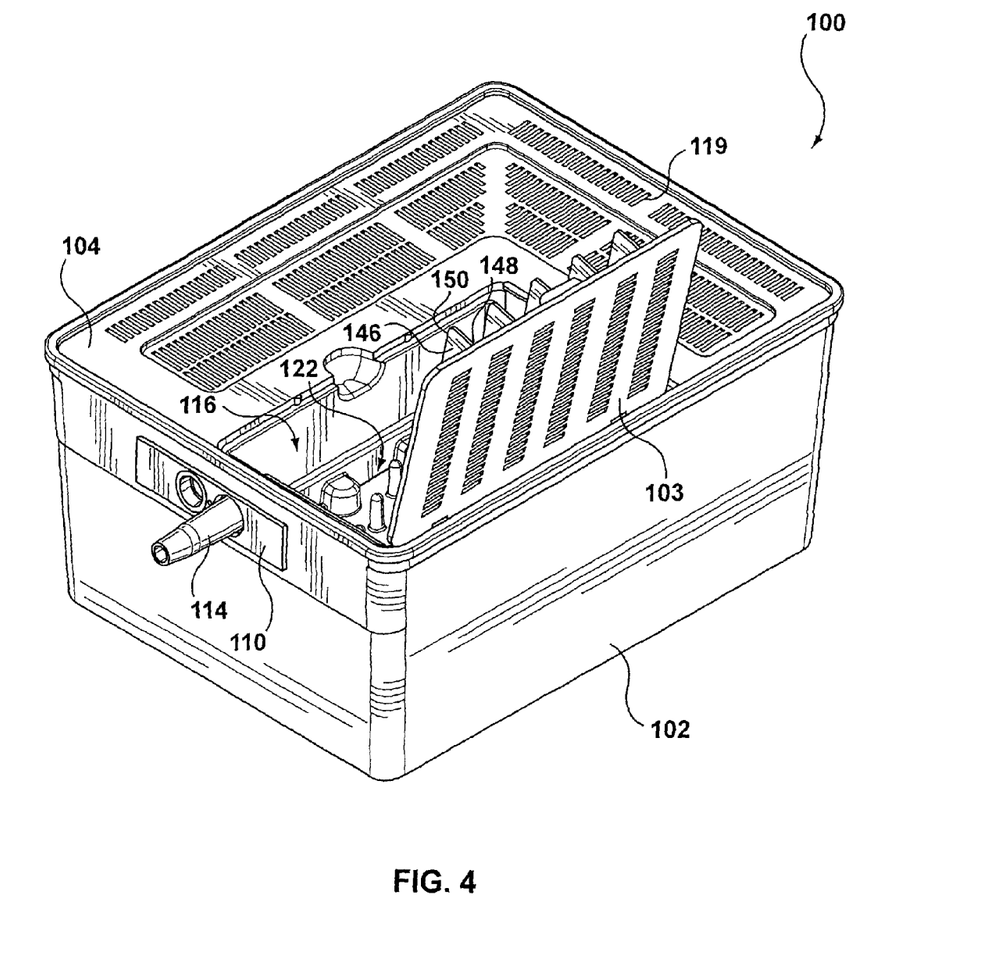

Referring to FIGS. 2 to 4, in the example shown, a tray 122 containing a powdered plant treatment formulation is receivable in the receptacle 116, so that the tray 122 and the plant treatment formulation are positioned in the exit path 117. As will be described in further detail below, bees passing through the receptacle 116 are encouraged to walk through the plant treatment formulation, so that the plant treatment formulation may be picked up by and cling to the bees, for delivery to a target plant, for example when the bees pollinate a target plant.

The tray may be made from a plastic, and may be of a one-piece construction. Further, the tray may be moisture impermeable, and light impermeable. This may help to prolong the shelf life of the plant treatment formulation.

Referring still to FIGS. 2 to 4, in the example shown, the tray 122 is removably receivable in the receptacle 116, and may be placed into the receptacle 116 and removed from the receptacle 116 when the receptacle lid 103 is open. In alternate examples, the tray 122 may be integral with or permanently mounted to the bee domicile 100. For example, the tray 122 may be integrally formed in the receptacle 116, and may be refilled when the receptacle lid 103 is open.

Figure 5:
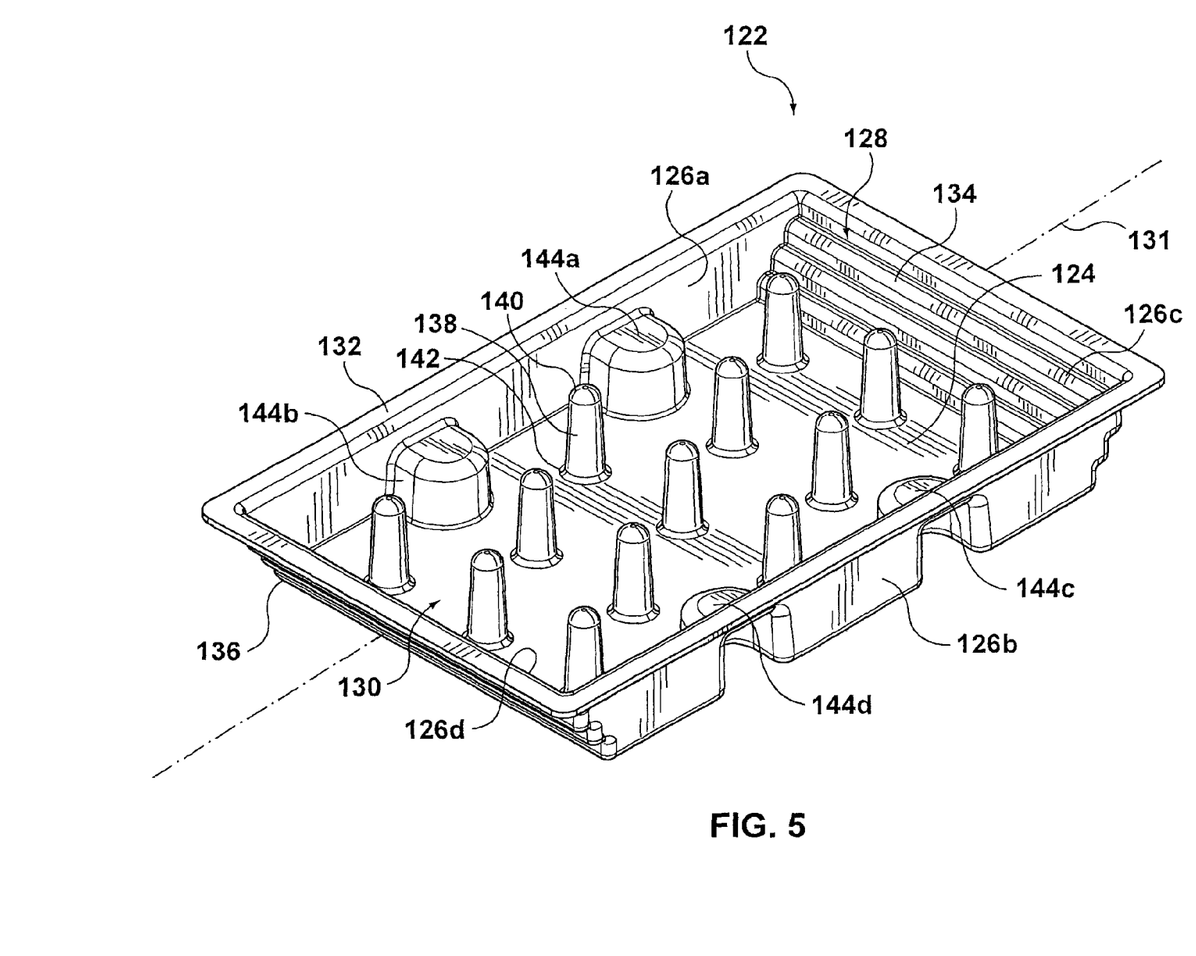

Referring to FIG. 5, in the example shown, the tray 122 includes a bee entrance end 128 that is positioned adjacent the receptacle entrance port 118 when the tray 122 is received in the receptacle 116, and a bee exit end 130 that is positioned adjacent the receptacle exit port 120 when the tray 122 is received in the receptacle 116. A longitudinal axis 131 of the tray 122 extends between the bee entrance end 128 and the bee exit end 130. In the example shown, the bee entrance end 128 and bee exit end 130 are substantially identical, and the tray 122 is generally symmetrical, so that the tray 122 may be inserted into the receptacle 116 in either of two orientations.

Referring still to FIG. 5, in the example shown, the tray further includes a base 124, and at least one side wall 126 extending upwardly from the base 124 and surrounding a periphery of the base 124. In the example shown, the tray 122 is generally rectangular, and includes four sidewalls 126, namely a pair of spaced apart walls 126a, 126b extending lengthwise between the bee entrance end 128 and bee exit end 130, and a pair of spaced apart walls 126c, 126d, extending widthwise along the bee entrance end 128 and bee exit end 130, respectively. The sidewalls 126 define an upper rim 132.

In use, the powdered plant treatment formulation may be provided as a layer on the base 124, and be contained by the sidewalls 126. The plant treatment formulation may have an initial depth on the base, i.e. a depth when the layer is first provided on the base, before depletion by the bees. In some examples, the initial depth of the plant treatment formulation on the base 124 may be selected such that:

(1) The initial depth is less than a spiracle height of the bees. Spiracle height may be defined as the distance from a surface upon which a bee is walking to the lowermost spiracle of the bee. By selecting the initial depth to be less than a spiracle height of the bees, the powder generally does not block the spiracles of the bees, and generally does not interfere with respiration of the bees.

(2) A depletion time of the layer corresponds to a shelf life of the plant treatment formulation. After the plant treatment formulation is first accessed by the bees (for example when the tray is first placed in the receptacle), it becomes depleted as the bees pick up the plant treatment formulation. After a certain amount of time, it becomes depleted to the point where the plant treatment formulation is no longer picked up by the bees in a sufficient amount to benefit the target crop. The time from when the plant treatment formulation is first accessed by the bees to the time the plant treatment formulation becomes depleted is referred to as the depletion time. Further, the plant treatment formulation generally has a shelf life. For example, as will be described below, the tray may initially be provided sealed with a removable top. The top may be removed prior to inserting the tray into the receptacle. After the top is removed, the plant treatment formulation may have a certain shelf life. For example, after the shelf life expires, the plant treatment formulation may have a decreased ability to benefit plants, may have a decreased ability to be picked up by bees, or may begin to degrade. In order to prevent wasting of the plant treatment formulation, the initial depth of the layer may be selected such that the depletion time of the layer corresponds to the shelf life of the plant treatment formulation. In some examples, the shelf life of the plant treatment formulation may be less than 10 days, for example between 4 days and about 5 days. The exact shelf life may depend on various factors, such as the composition of the formulation, and the ambient humidity and temperature.

In some examples, in order to meet the above requirements, the initial depth may be selected to be between about 2 mm and about 4 mm.

The tray 122 may optionally be sold pre-filled with the plant treatment formulation, so that when the plant treatment formulation is spent (for example after several days), the tray 122 may be removed and discarded and replaced with a fresh tray. In such examples, the tray 122 may include a removable top (not shown) sealed to the upper rim 132. The removable top may be a metal foil, which may be heat-sealed to the upper rim 132, and which may be peeled off by a user prior to insertion into the receptacle 116. The removable top may be light impermeable and moisture impermeable, in order to maintain the freshness and efficacy of the plant treatment formulation.

In some examples, the removable top may carry a net positive electrostatic charge. As will be described further below, the plant treatment formulation may include a positively charged component. The positively charged component in the plant treatment formulation and the removable top may repel each other, so that the plant treatment formulation does not stick to the removable top.

Referring still to FIG. 5, in the example shown, the sidewall 126c defines a first set of steps 134 leading downwardly to the base 124 at the bee entrance end 128, and the sidewall 126d defines a second set of steps 136 leading upwardly from the base 124 at the bee exit end 130. The first 134 and second 136 sets of steps may aid the bees in entering and exiting the tray 122. In alternate examples, a bee entrance end and/or bee exit end may include a ramp or ladder to aid the bees in entering and/or exiting the tray.

Referring still to FIG. 5, in the example shown, the tray 122 includes a plurality of posts 138 extending upwardly from the base 124, and positioned between the bee entrance end 128 and bee exit end 130. The posts act as obstacles around which the bees walk to reach the bee exit end 130 from the bee entrance end 128. In the example shown, the posts 138 are positioned such that they are generally staggered, so that there is no straight path parallel to axis 131 along which the bees can walk from the bee entrance end 128 to the bee exit end 130. This increases the length of the path the bees take between the bee entrance end 128 and the bee exit end 130, which increases the amount of plant treatment formulation picked up by the bees when passing through the tray 122. In addition, this encourages the bees to take different paths through the tray 122, which helps to keep the powder evenly distributed and not packed down in a track.

Referring still to FIG. 5, in the example shown, the posts 138 are generally circular in cross-section. In alternate examples, posts may be another shape in cross-section, such as square.

Referring still to FIG. 5, in the example shown, each post 138 has a top end 140 and an opposed bottom end 142 at the base 124, and each post 138 is radiused at the bottom end 142. The radiused portion extends between the post 138 and the base 124. The radiused portions can help to reduce building up and packing down of plant treatment at the bottom ends 142 of the posts 138.

Referring still to FIG. 5, in the example shown, the tray 122 may further include at least one obstruction extending inwardly from the sidewalls 126 and upwardly from the base 124. Referring to FIG. 5, in the example shown, the tray 122 includes two obstructions 144*a*, 144*b*, extending inwardly from sidewall 126*a*, and two obstructions 144*c*, 144*d*, extending inwardly from sidewall 126*b*. The obstructions extend generally inwardly from the sidewalls 126 towards the longitudinal axis 131 of the tray 122. The obstructions 144 may generally serve to discourage the bees from walking in a straight line from the bee entrance end 128 to the bee exit end 130 along the sidewalls 126*a*, 126*b*, and to encourage the bees to walk amongst and around the posts 138. Again, this increases the length of the path the bees take between the bee entrance end 128 and the bee exit end 130, and encourages the bees to take different paths through the tray 122.

As mentioned above, the receptacle lid 103 covers the receptacle 116, and also the tray 122. Referring back to FIG. 4, in the example shown, the receptacle lid 103 and the tray 122 cooperate to encourage the bees to walk along the base 124 of the tray 122 and through the powder, rather than flying through the receptacle 116. Specifically, the receptacle lid 103 is positioned above the sidewalls 126, and includes at least one downwardly extending barrier wall 146. In the example shown, the receptacle lid 103 includes a plurality of downwardly extending barrier walls 146. The barrier walls 146 extend across the receptacle lid 103 in a direction transverse to the longitudinal axis 131 of the tray 122 (when the tray is received in the receptacle). The barrier walls 146 have a top end 148 and a bottom end 150, and a height extending therebetween. The height of the barrier walls 146 is selected so that for the duration of the depletion time, the distance between the bottom ends 150 of the barrier walls 146 and the layer of powder on the base is generally too small for a bee to fly between. The distance between the bottom ends 150 of the barrier walls 146 and the layer of powder on the base may also be referred to herein as the vertical clearance of the exit pathway. For example, the vertical clearance may be less than 1 inch, and more specifically less than 0.75 inches. In one particular example, the height of the tray 122 is about 0.75 inches, the barrier walls 146 extend to the top of the tray 122, and the initial depth of the layer is 2-4 mm (0.08 to 0.16 inches. In this particular example, the vertical clearance is between about 0.59 inches and 0.67 inches. This may generally encourage the bees to walk along the base 124 of the tray 122.

In alternate examples, the bees may be encouraged to walk along the base 124 of the tray 122 and through the powder in another manner. For example, the height of the receptacle 116 may be selected so that the distance between the top ends 140 of the posts 138 and the receptacle lid 117 is generally too small for a bee to fly between.

In the example shown, the barrier walls 146 additionally serve to discourage the bees from walking upside down along an interior surface of the receptacle lid 103 and thereby avoid the powder altogether.

Referring back to FIGS. 1 and 2, in the example shown, the domicile 100 further includes a door 154, which may be opened and closed to block and unblock the receptacle entrance port 118, to selectively allow or prevent access to the receptacle 116 by the bees. For example, when replacing tray 122 with a fresh tray, it may be desirable to close the door 154 prior to opening the receptacle lid 103, so that when receptacle lid 103 is open, bees cannot exit the domicile 100 via the open receptacle lid 103. In FIG. 1, the door 154 is shown in a closed position. In order to open the door 154, it may be pulled upwardly, and then pivoted rearwardly so that it rests on the domicile lid 104.

In the example shown, the receptacle 116 and the tray 122 (when received in the receptacle 116) are internal to the domicile 100. In alternate examples, the receptacle 116 and the tray 122 may be external to the domicile 100.

For example, referring now to FIGS. 9 and 10, in which like reference characters are used to refer to like features as in FIGS. 1 to 5, incremented by 800, an alternate exemplary bee domicile 900 is shown, wherein the receptacle 916 and tray 922 are external to the bee domicile 900.

Referring still to FIG. 9, the bee domicile 900 includes an entrance/exit assembly 910 that is mountable to the entrance port 906 and the exit port 908 of the bee domicile 900. The entrance/exit assembly 910 is similar to the entrance/exit assembly 110; however in the entrance/exit assembly 910, both the entrance conduit and the exit conduit (not shown) extend inwardly into the body 902.

Referring to FIG. 10, the receptacle 916 is a separate unit from the bee domicile 900, and includes a rear wall 956, a top wall 958, a bottom wall 960, and opposed side walls 962, 964. The top wall 958, bottom wall 960, and side walls 962, 964 define a front opening 965 opposed to the rear wall 956. A removable door 957 (shown in FIG. 9) is mountable to the receptacle 916 over the front opening 965. Hooks 966 are provided adjacent the rear wall 956, and are usable to mount the receptacle 916 to a front face 958 of the body 902 of the bee domicile 900.

Figure 10:
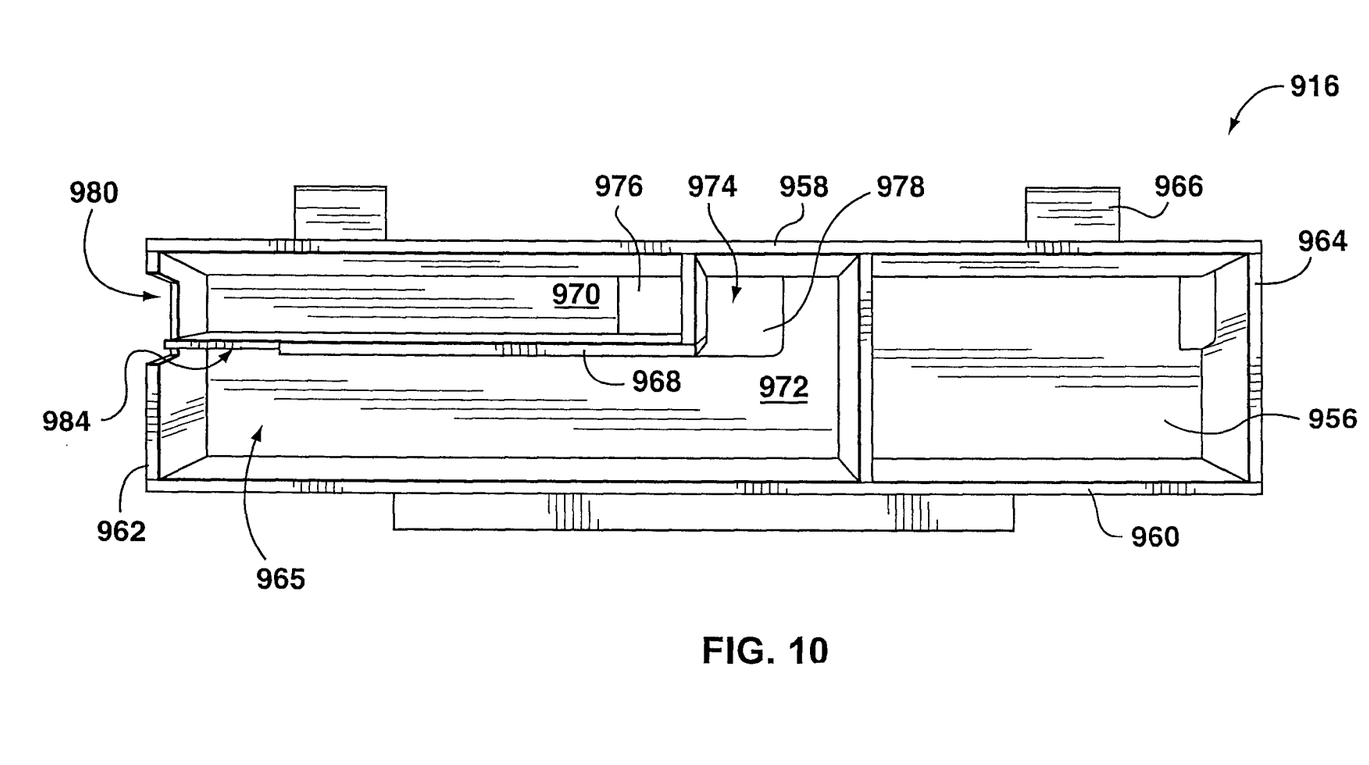

Referring still to FIG. 10, the receptacle 916 includes an interior dividing wall 968, which divides the receptacle into a first chamber 970, and a second chamber 972. Bees enter the bee domicile 900 via the first chamber 970, and exit the bee domicile 900 via the second chamber 972.

Referring still to FIG. 10, in the example shown, the rear wall includes an aperture 974. The dividing wall 968 extends across the aperture 974, and divides the aperture into a first chamber exit port 976, and a second chamber entrance port 978. The first chamber exit port 976 is aligned with the entrance conduit of the entrance/exit assembly 910, and bees pass from the first chamber 970 into the bee domicile 900 via the first chamber exit port 976. The second chamber entrance port 978 is aligned with the exit conduit of the entrance/exit assembly 910, and bees pass from the bee domicile 900 into the second chamber 972 via the second chamber entrance port 978.

Referring still to FIG. 10, in the example shown, the side wall 962 includes an aperture 980 in communication with the first chamber, 970. Further, the dividing wall 968 includes an aperture 984, which provides a path between the second chamber 972 and the aperture 980. Bees enter the first chamber 970 through the aperture 980. Bees exit the second chamber 972 through the aperture 984 in the dividing wall 968, and then pass through the aperture 962 in the side wall.

Referring back to FIG. 9, a tray 922 is receivable in the receptacle 916. The tray 922 is similar to tray 122; however, the posts 938 are generally square in cross section, and are aligned in a series of rows and columns, rather than being staggered. Further, the bee entrance end 928 and bee exit end 930 do not include stairs. Instead the bee entrance end 928 includes a generally upright wall 929, and the bee exit end includes a sloped wall 931.

Figure 9:
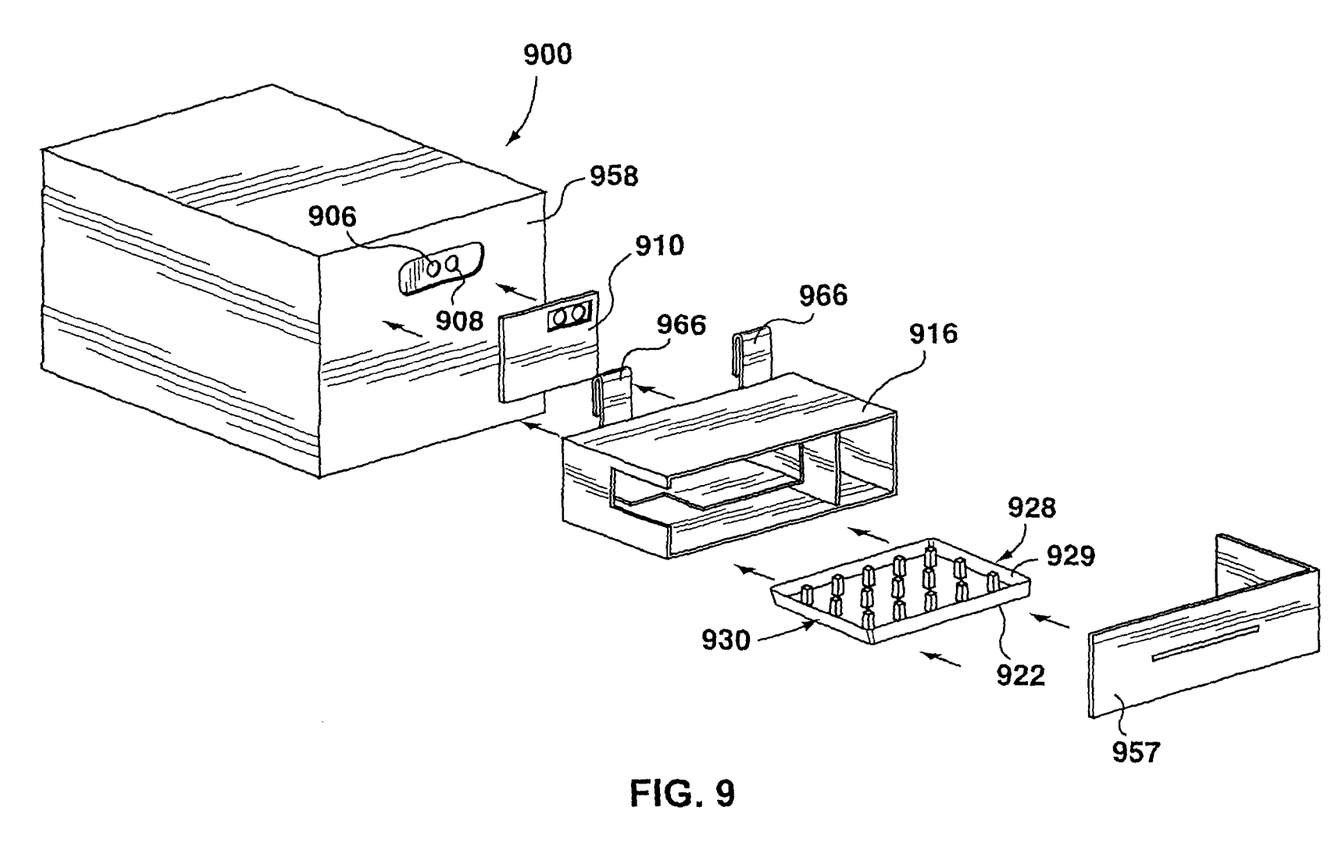

The tray 922 is receivable in the second chamber 972, and may rest on the bottom wall 960 of the receptacle 916. The tray 922 may be inserted into and removed from the second chamber 972 when the door 957 is open. Bees passing through the second chamber 972 are encouraged to walk through a plant treatment formulation housed in the tray 922, so that the plant treatment formulation may be picked up by and cling to the bees, for delivery to a target plant, for example when the bees pollinate a target plant.

Figure 6:
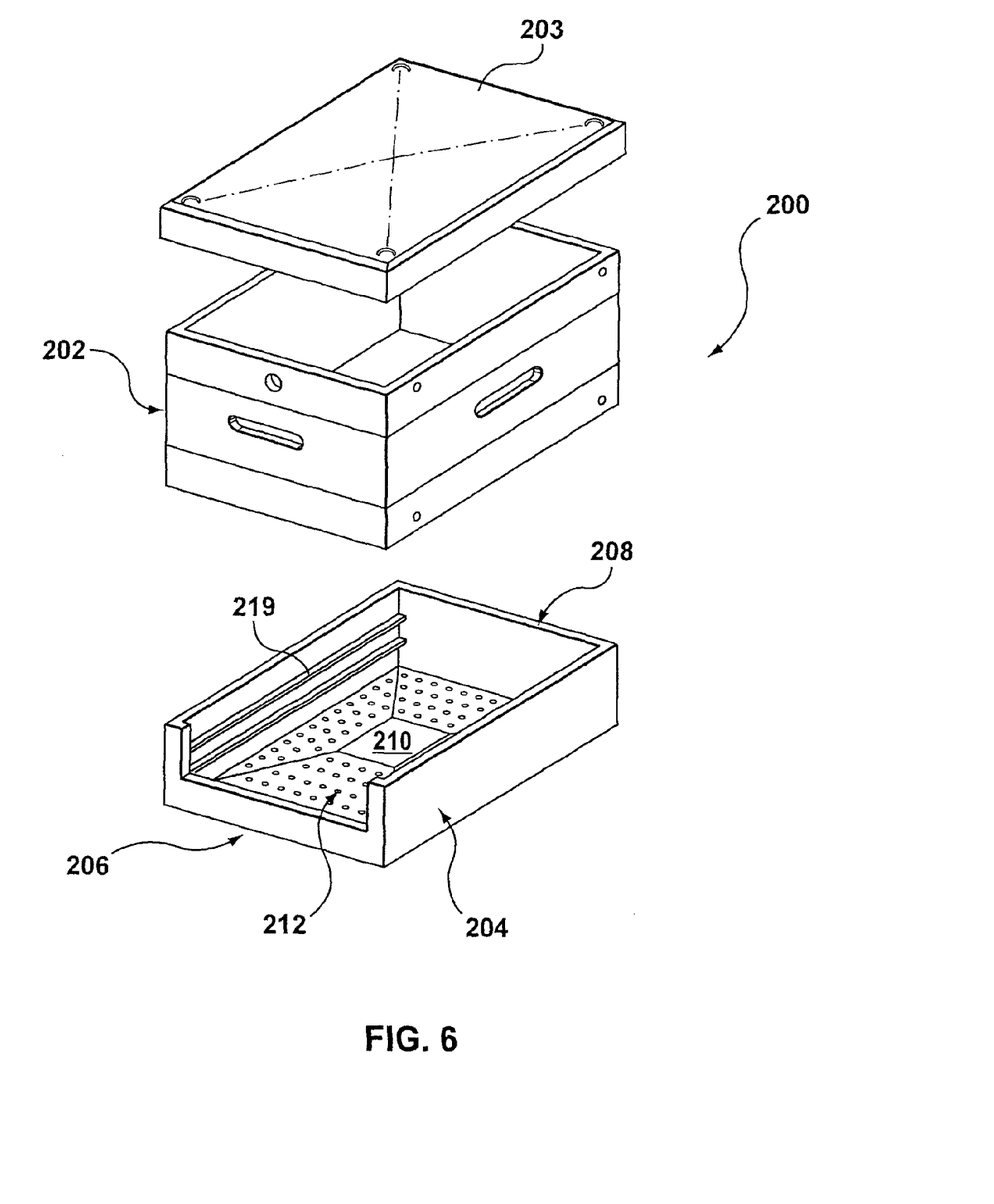
Figure 7:
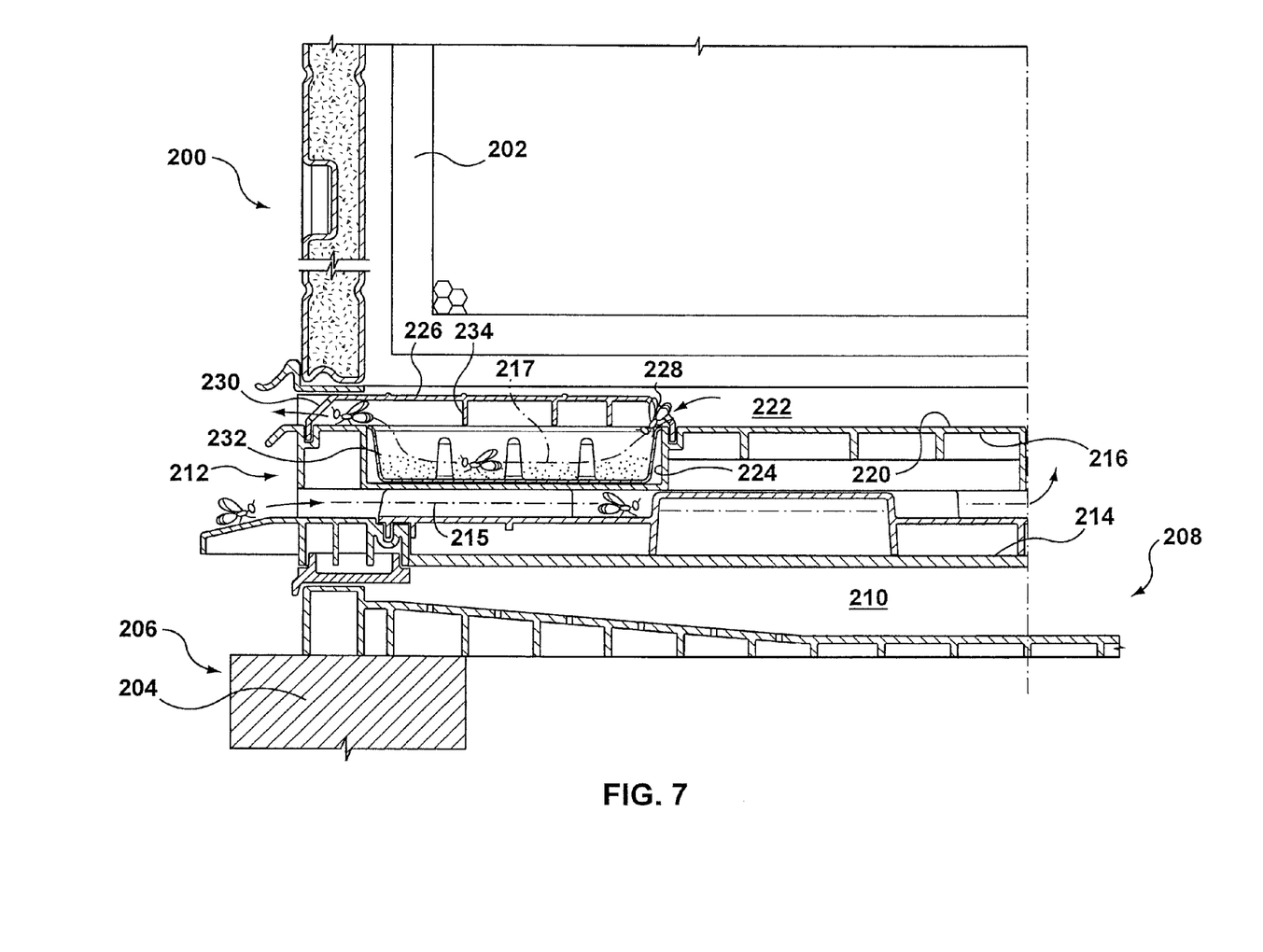
Figure 8:
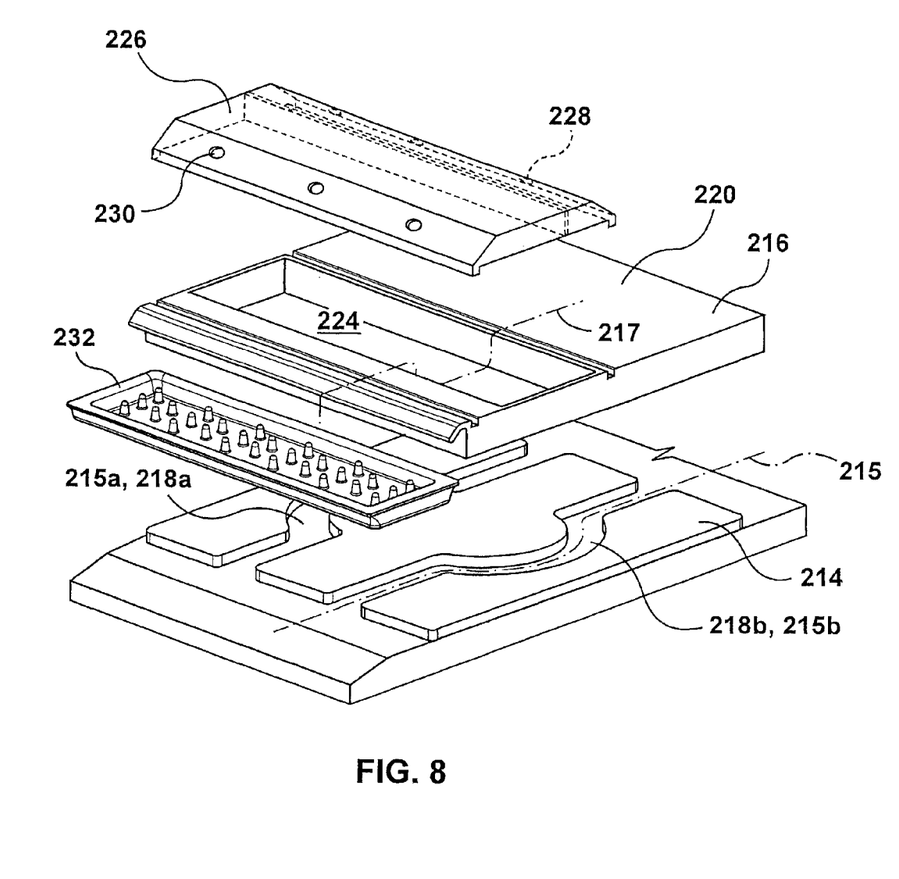

Referring now to FIG. 6, an alternate exemplary bee domicile 200 is shown. The domicile 200 may be colonized by honey bees, and includes at least one super 202, and a bottom board 204. A lid 203 is mounted to the super 202. The bottom board 204 includes a forward end 206, a rearward end 208, and an interior cavity 210. The forward end 206 includes a bottom board opening 212 for opening the interior cavity 210 to the outside environment. The at least one super 202 is open to the rearward end 208.

Referring now to FIGS. 7 and 8, the domicile 200 further includes an entrance board 214, and an exit board 216, which are receivable in the bottom board 204. In the example shown, the bottom board 204 includes interior rails 219 (shown in FIG. 6), and the entrance board 214 and exit board 216 are slidably receivable in the bottom board through the bottom board opening 212 and along the rails 219. The entrance board 214 and exit board 216 are receivable in the bottom board 204 such that they are vertically stacked. In the example shown, the exit board 216 is positioned vertically above the entrance board 214; in alternate examples the exit board 216 may be positioned vertically below the entrance board 214.

The entrance board 214 defines at least one entrance pathway 215 for bees to reach the at least one super 202 from the opening 212. Referring still to FIGS. 7 and 8, in the example shown, the entrance board 214 includes two entrance pathways **215*a*, 215*b*. The entrance pathways 215*a*, 215*b* are defined by two channels 218*a*, 218*b* formed in the entrance board 214. When the entrance board 214 and exit board 216 are received in the bottom board 204, the exit board 216 covers the channels 218*a*, 218*b*. The channels 218*a*, 218*b* extend from the forward end 206 of the bottom board 204 to the rearward end 208 of the bottom board 204 when the entrance board 214 is received in the bottom board 204. The channels 218*a*, 218*b* may include a light blocking feature, to block light entering the bottom board 204 through the bottom board opening 212. In the example shown, the channels 218*a*, 218*b* are curved to block light entering the bottom board 204 through the bottom board opening 212**.

The exit board 216 defines an exit pathway 217 for the bees to reach the bottom board opening 212 from the at least one super 202. Referring still to FIGS. 7 and 8, the exit board includes an upper surface 220. When the exit board 216 is received in the bottom board 204, the upper surface 220 is spaced vertically below the super 202, and a gap 222 is defined between the upper surface 220 and the super 202. The exit board 216 further includes a downwardly extending recess 224 (also referred to as a receptacle) positioned forwardly of the upper surface 220. An openable lid 226 is mounted over the recess 224, and includes at least one bee entrance port 228 positioned adjacent the upper surface 220 when the lid 226 is mounted over the recess 224, and at least one bee exit port 230 positioned adjacent the bottom board opening 212 when the lid is mounted over the recess 224. When the lid 226 is mounted over the recess 224 and the exit board 216 is received in the bottom board 204, the lid 226 is positioned closely to the super 202, so that bees generally may not fly between the lid 226 and the super 202. In order to exit the bee domicile 200, bees may pass from the super 202 to the region of the upper surface 220, and may then walk along the upper surface 220 or fly in the gap 222 towards the recess 224. Bees may then enter the recess 224 via the bee entrance ports 228, pass through the recess 224, exit the recess 224 via the bee exit ports 230, and pass through the bottom board opening 212.

Referring still to FIGS. 7 and 8, a tray 232 is receivable in the recess 224, so that it is positioned in the exit pathway 217, and through which the bees may walk to reach the opening 212 from the at least one super 202. The tray 232 is similar to the tray 122 described above with reference to FIGS. 1 to 4, and is configured to receive a powdered plant treatment agent. As described above with reference to tray 122, bees passing through the recess 224 are encouraged to walk through the plant treatment formulation housed in the tray 232, so that the plant treatment formulation is picked up by and clings to the bees, and is delivered to a target plant when the bees pollinate a target plant.

When the plant treatment formulation in the tray 232 is spent, the exit board 216 may be slid out of the bottom board 204 through the opening 212, the lid 226 may be removed from the recess 224, and the tray 232 may be removed from the recess 224 and replaced with a fresh tray. Alternately, the tray 232 may be refilled.

Similarly to the receptacle lid 103 described above with reference to FIGS. 1 to 4, the lid 226 includes downwardly extending barrier walls 234, which cooperate with the tray 232 to discourage the bees from flying through the tray 232 and encourage the bees to walk through the powder. In this example, the vertical clearance may be less than 1 inch, more specifically less than 0.875 inches. In one particular example, the vertical clearance may be about 0.715 inches and about 0.795 inches.

The trays 122 and 232 may house any suitable powder formulation for the treatment of plants. Suitable formulations may generally include a plant treatment agent (i.e. an agent that is beneficial to a crop), and one or more additives.

The invention claimed is:

1. A method for dusting bees with a plant treatment formulation, the method comprising:
   a) providing a tray in an exit path of a bee hive, the tray having a base;
   b) providing a layer of the plant treatment formulation on the base, the layer having an initial depth, the exit path having a vertical clearance above the layer;
   c) selecting the initial depth such that:
      i) the initial depth is less than a spiracle height of the bees; and
      ii) a depletion time of the layer corresponds to a shelf life of the plant treatment formulation; and
   d) selecting the vertical clearance such that for the duration of the depletion time, bee flight within the exit path is discouraged.

2. The method of claim 1, wherein the initial depth is between about 2 mm and about 4 mm.

3. The method of claim 1, wherein the depletion time and the shelf life are less than 10 days.

4. The method of claim 3, wherein the depletion time and the shelf life are between 4 days and 5 days.

5. The method of claim 1, wherein the vertical clearance is less than 1 inch.

6. The method of claim 1, wherein the bees are bumble bees, and the vertical clearance is less than 0.875 inches.

7. The method of claim 1, wherein the bees are honey bees, and the vertical clearance is less than 0.75 inches.

* * * * *